Patented June 1, 1937

2,082,573

UNITED STATES PATENT OFFICE 2,082,573

TREATMENT OF FRUIT

Ralph E. Hall, Mount Lebanon, Pa., assignor to Hall Laboratories, Inc., Pittsburgh, Pa., a corporation of Pennsylvania No Drawing. Application April 19, 1934, Serial No. 721,315

12 Claims. (Cl. 99—103)

This invention relates to the treatment of fruit, and more particularly to the cleansing of fruit to clean it from residues resulting from the use of material which has been sprayed on the fruit while on the trees to prevent spoilage by insects.

It is common practice to spray fruit trees with insecticides to prevent spoilage of the fruit. Various insecticides are employed, among which are calcium arsenite and lead arsenate. These materials are generally mixed with a spreader and sprayed onto the fruit on the trees. Among the spreaders commonly employed are fish oil, mineral oil, oleic acid and stearic acid. Another spreader commonly employed is pine tar. The spreaders are employed for the purpose of causing the insecticide to stick on the fruit. Lime sulphur compounds mixed with a spreader are also used in the treatment of citrous fruit. The trees and fruit are sometimes subjected to smoke or smudge from oil heaters to prevent the effects of frost. The use of any of these materials or other materials, although useful in protecting the fruit against insects and in preventing the effects of frost, renders the cleaning of the fruit difficult. The deposit on the fruit also contains loose sand and dirt.

In accordance with the present invention, fruit having deposits of the character referred to is cleansed with a solution containing an alkali-metal hexametaphosphate, for example sodium hexametaphosphate. Such solution has the required emulsifying and peptizing properties necessary to remove the oily deposit from the fruit and at the same time has a sufficiently low alkalinity so as not to injure it.

The preferred procedure is to soak the fruit in a solution containing sodium hexametaphosphate, then brush it to remove the deposit, and then rinse it to remove the last traces of foreign matter and the excess soaking tank solution. It is preferred to use a soap in conjunction with the alkali-metal hexametaphosphate in order to increase the detergent and emulsifying action on the deposit. The sodium hexametaphosphate is slightly acid, having a pH value in dilute solution of about 6. In order to make the detergent action of the soap most effective, it is preferable to adjust the solution so that it has a pH value of about 8 to 8.5. This may be done by employing any suitable alkali, for example trisodium phosphate, sodium carbonate or sodium silicate, in addition to the alkali-metal hexametaphosphate and soap. The alkali also aids in emulsifying the oily deposit on the fruit.

Sodium hexametaphosphate has an emulsifying effect on the oily deposits even when used alone, but the emulsifying action is increased by the use of soap and/or an alkali. A preferred solution contains about 1% sodium hexametaphosphate, about 1% of soap and about 1% of trisodium phosphate.

Foreign matter found on almost all citrus fruits include loose sand and dust, scale and insect deposits, oil soot from orchard heaters, oil spray residues, and lime sulphur spray deposits. The solid materials including the insecticides, are held on the fruit by the oil spray residues or the oil soot from the heaters. The alkali-metal hexametaphosphate employed in my solution emulsifies the oily deposits so that they, as well as the solid material embedded therein, may be more easily removed from the fruit.

Furthermore, the hexametaphosphate has the property of dissolving certain otherwise insoluble insecticidal metallic salts, particularly the salts of calcium, lead and copper. Lead arsenate and calcium arsenite is sometimes used with an oil spreader in the treatment of apples. When the oil spray residue containing lead arsenate and/or calcium arsenite is subjected to a solution containing hexametaphosphate, the hexametaphosphate not only emulsifies the oil spray residue, but also has a solvent effect on the lead and/or calcium so that it can be easily removed. Sodium hexametaphosphate has a similar effect in dissolving copper salts, such as copper acetometarsenite (Paris green). Even in those cases where insecticides are used which are not as easily dissolved as the copper, lead or calcium arensates and arsenites, the hexametaphosphate solution has a beneficial effect in that it emulsifies the oily residue, thereby enabling the insecticide to be readily removed from the fruit.

The alkali-metal hexametaphosphate is particularly useful in cleaning the fruit where hard water is employed. The calcium and magnesium in hard water react with soap which is generally employed in the cleaning of fruit, forming insoluble calcium and magnesium soaps, resulting in a sticky scum which is hard to remove from the fruit. The precipitation of these insoluble soaps is prevented by the use of an alkali-metal hexametaphosphate. Where, for example, sodium hexametaphosphate is employed with a hard water, it sequesters the calcium and magnesium, forming a very slightly ionized soluble complex from which the calcium and magnesium are not taken by the soaps. If a hard water is employed in washing the fruit, the amount of hexametaphosphate used should be sufficient to soften the water against soap and also to provide a sufficient amount of the hexametaphosphate to emulsify the oil residue on the fruit.

The softening effect of sodium hexametaphosphate on hard water is believed to result from the formation of slightly ionized soluble complex salts of sodium hexametaphosphate and calcium and/or magnesium. It is believed that the complex calcium salt has the formula, $Na_2Ca_2P_6O_{18}$. The magnesium salt is believed to have the formula, $Na_2Mg_2P_6O_{18}$. In solution these salts are ionized to yield 2 sodium ions and a complex anion such as $Ca_2P_6O_{18}^{--}$. The complex anion $Ca_2P_6O_{18}$ ionizes to a very slight extent to yield 2 calcium ions and the anion $P_6O_{18}^{------}$, but this ionization is so slight that the calcium ion concentration is maintained at a value below that necessary for the precipitation of insoluble calcium soaps and salts, such as calcium oleate, calcium carbonate, calcium phosphate, or calcium arsenite. When sodium hexametaphosphate, $Na_6P_6O_{18}$, is dissolved in water, it ionizes to form 2 sodium ions and an anion $Na_4P_6O_{18}^{--}$. The ionization of this anion into 4 sodium ions and the anion $P_6O_{18}^{------}$ is somewhat greater than that of the complex anion, $Ca_2P_6O_{18}$. Therefore, if calcium ion is present in solution the anion, $Na_4P_6O_{18}$, will exchange its sodium for calcium, thereby maintaining the solution continuously unsaturated with respect to calcium soaps, calcium carbonate, phosphate or arsenite, and under such circumstances these materials will dissolve. It is by this mechanism that the sodium hexametaphosphate solutions are capable of dissolving the calcium arsenite, and it is by an analogous mechanism that their solvent effect on lead and copper salts is believed to exist.

The alkali-metal hexametaphosphate which I prefer to use is the soluble sodium hexametaphosphate sometimes called "Graham's salt". The sodium hexametaphosphate is assumed to be a complex of the general formula $Na_2(Na_4P_6O_{18})$, although some authorities believe that salts of the formulas $Na_5(NaP_6O_{18})$ and $Na_4(Na_2P_6O_{18})$ may also be present. Sodium hexametaphosphate in readily soluble form may be prepared by strongly heating monosodium dihydrogen orthophosphate, and rapidly cooling the molten mass. The quick cooling is apparently essential to the formation of a readily soluble salt. I prefer to prepare the hexametaphosphate so that it contains a few per cent of pyrophosphate. This may be done by admixture of a small amount of disodium monohydrogen orthophosphate with the monosodium dihydrogen orthophosphate before the heating. When I speak of hexametaphosphate therefore, I mean either the pure hexametaphosphate or hexametaphosphate containing a few per cent of pyrophosphate.

While I prefer to use the sodium hexametaphosphate, other alkali-metal hexametaphosphates may be used, such, for example, as potassium hexametaphosphate, lithium hexametaphosphate, and ammonium hexametaphosphate.

The use of my solution containing an alkali-metal hexametaphosphate in the treatment of fruit is applicable irrespective of any particular washing method or apparatus. The proportions of alkali-metal hexametaphosphate, soap and alkali may be varied according to the extent and character of the deposit, and the time of soaking and brushing may be varied. The temperature of the solution should be such as to effectively remove the deposit without injuring the fruit, a temperature of 115 to 120° F. being generally suitable. Kerosene or other suitable petroleum distillate may be employed in the washing solution if desired.

While I have specifically described the preferred procedure in carrying out my invention, it is to be understood that the invention may be otherwise embodied or practiced within the scope of the following claims.

I claim:

1. The process of dissolving lead arsenate, which comprises subjecting it to a solution containing an alkali-metal hexametaphosphate.

2. The process of dissolving lead arsenate, which comprises subjecting it to a solution containing sodium hexametaphosphate.

3. The process of dissolving lead arsensate from spray residue on fruit, which comprises subjecting the residue to a solution of an alkali-metal hexametaphosphate.

4. The process of dissolving arsenic compounds of lead, copper and calcium from spray residue on fruit, which comprises subjecting the residue to a solution of an alkali-metal hexametaphosphate.

5. The process of dissolving arsenic compounds of lead and copper from spray residue on fruit, which comprises subjecting the residue to a solution of an alkali-metal hexametaphosphate.

6. The process of dissolving lead and copper insecticides from spray residue on fruit, which comprises subjecting the residue to a solution of an alkali-metal hexametaphosphate.

7. The process of dissolving lead and copper insecticides from spray residue on fruit, which comprises subjecting the residue to an alkaline solution of an alkali-metal hexametaphosphate.

8. The process of removing spray residue from fruit, which comprises cleansing it with a solution containing an alkali-metal hexametaphosphate.

9. The process of removing spray residue from fruit, which comprises cleansing it with a weakly alkaline solution containing an alkali-metal hexametaphosphate.

10. The process of removing spray residue from fruit, which comprises cleansing it with a solution containing sodium hexametaphosphate.

11. The process of removing spray residue from fruit, which comprises cleansing it with a solution containing an alkali-metal hexametaphosphate and soap.

12. The process of removing spray residue from fruit, which comprises cleansing it with a solution containing an alkali-metal hexametaphosphate, soap, and an alkali.

RALPH E. HALL.